M. H. CAIN.
WHEEL RIM AND TIRE.
APPLICATION FILED JUNE 23, 1913.
1,091,807. Patented Mar. 31, 1914.
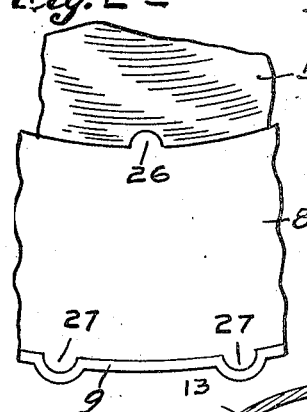
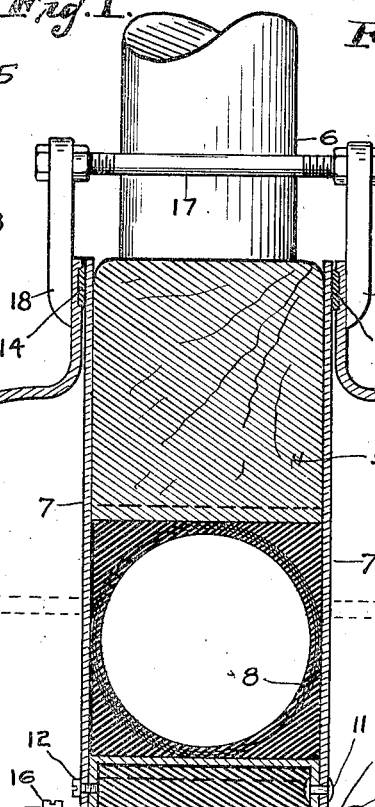
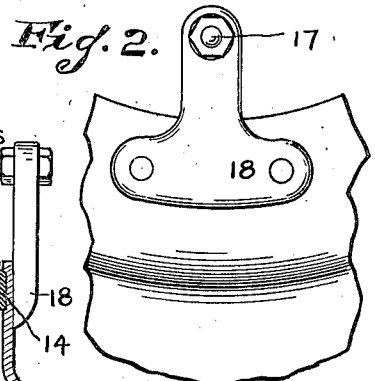
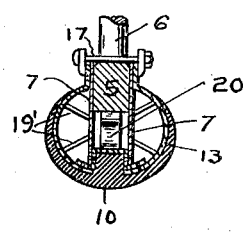
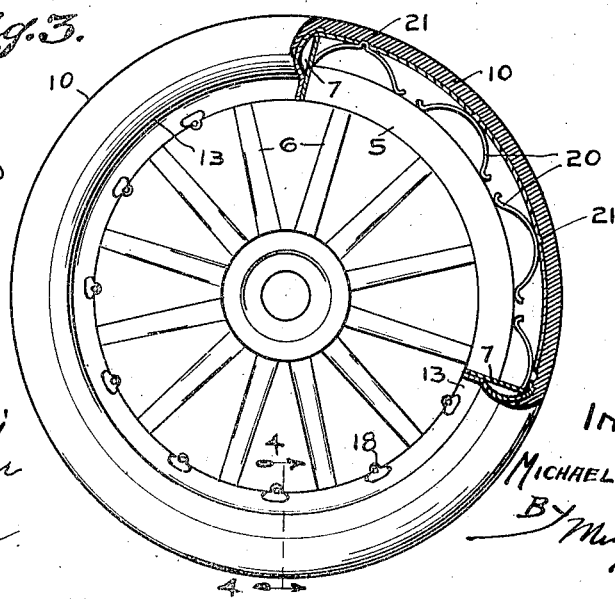
WITNESSES:
L. B. Woerner
B. Overman
INVENTOR:
Michael H. Cain,
BY Minturn & Woerner
Attorneys.

UNITED STATES PATENT OFFICE.

MICHAEL H. CAIN, OF INDIANAPOLIS, INDIANA.

WHEEL RIM AND TIRE.

1,091,807. Specification of Letters Patent. Patented Mar. 31, 1914.

Application filed June 23, 1913. Serial No. 775,247.

*To all whom it may concern:*

Be it known that I, MICHAEL H. CAIN, a citizen of the United States, residing at Indianapolis, in the county of Marion and State of Indiana, have invented certain new and useful Improvements in Wheel Rims and Tires, of which the following is a specification.

The object of this invention is to provide an elastic tire for vehicles which will have the same resiliency as the pneumatic tires now in common use on automobile and the like vehicle wheels, but which will require a smaller inner tube and therefore be less expensive to manufacture, and wherein the said tube by the protection afforded will be free from the danger of injury due to punctures.

A further object of the invention is to provide a tire which can be readily dismembered to afford access to its various parts, and to assemble said parts in a manner to permit of their ready and separate removal for purposes of repair and renewal.

I accomplish the above and other objects which will hereinafter appear, and which will be particularly pointed out, by the mechanism illustrated in the accompanying drawing in which—

Figure 1 is a cross section of the felly of a wheel equipped with my improved tire. Fig. 2 is a fragment in side elevation of the tire showing the means for clamping the inner edges of the tire together. Fig. 2ᵃ is a fragment in vertical section showing the means to prevent the crawling of the inner tube. Fig. 3 is a side view of a wheel with parts broken away equipped with a modified form of my invention in which the inner rubber air tube is replaced by leaf springs, and Fig. 4 is a cross section on the line 4—4 of Fig. 3.

Like characters of reference indicate like parts throughout the several views of the drawing.

5 is the rim or felly of the wheel to which my improved tire is to be applied, and 6 are the spokes.

7 are a pair of annular metal plates between which the felly 5 is located in the manner shown in Fig. 1. The radial dimensions of the plates 7 are greater than the contacting faces of the felly, and the extra dimensions of the plates are outwardly of the felly to form a closure within which an inflated rubber tube 8 is assembled. The outer edges of the two plates 7 are fastened to the sides of a channel of an annular metal sleeve 9 which surrounds the wheel and completes the closure containing the pneumatic tube 8. The annular channel above referred to, is formed in the sleeve 9 for the double purpose of providing suitable walls to which the plates 7 can be fastened, and also to provide means for more securely retaining a rubber tread 10 with which the completed rim structure is covered, the rubber of the tread 10 entering said channel in the manner as clearly shown in Fig. 1. The plate 7, on one side of the tire may be permanently secured to the wall of the channel by rivets 11, but the plate on the other side will preferably be secured to its wall of the channel by screws 12 to permit of removal when it is desired to take the plate 7 off to gain access to the inner located members of the device, and particularly to the inner tube 8. I have shown the inner tube 8 as being square in cross section, the angular portions being added in order to fill out the corners of the tube receptacle so as to preserve the cylindrical form of the inner tube at all times, as much as possible, and avoiding the possibility of cutting the tube by its being forced into the corners of its recess, and particularly into the inner corners where there is constant movement of the felly against the plates due to the vibration of the tire on the wheel, and which would increase the cutting tendency. These angular reinforcements may be omitted however without departing from the spirit of my invention.

Secured to the annular edges of the sleeve 9 are the metal case rings which extend around the wheel and which are substantially the same width as their adjacent plates 7. The inner edges of the case rings 13 and the body of the ring for an appreciable distance from the inner edges are parallel with the plates 7 and are in close contact with said plates, or, preferably are separated therefrom by lubricant-carrying packing rings 14, and channels in the inner faces of the case rings will be provided, as shown, to form seats to receive the packing rings, this packing keeps mud and dirt from working into the hollow interior of the tire. The rest of the case rings between the inner parallel portions above described, and the outer edges of the rings are curved or bowed outwardly in semi-elliptical or semi-circular cross section, as shown in Fig. 1 to broaden the tread of the tire, and this tread is covered with rubber 10, in the manner shown, the edges of the tread being provided with ribs to enter the channeled edge 24 of a clamping plate secured to ring 13. The outer edges of one of the casing rings may be permanently riveted to the sleeve 9, on that side where the plate 7 is riveted to said sleeve, but the case-ring on the other side of the tire will preferably be secured by screws 16 to permit the removal of case-ring 13 on that side when desired.

Clamps are placed from one side to the other across the felly between the spokes to prevent the members of my improved tire from spreading from pressure, and to regulate the friction between the plate 7 and case-rings 13. These clamps comprise bolts 17 and bearing plates 18 fastened to the case-rings at each end of each bolt. The collapse of the case-rings 13 may be prevented where the service is unusually heavy and severe, by the introduction of bolts 19, shown in dotted lines in Fig. 1, extending through the case-rings 13 and bearing against the plate 7, but for general purposes these bolts will not be required.

To keep the parts from crawling by the travel of the wheel I provide transverse channels in the felly 5 and corrugations in the sleeve 9 to receive ribs 26 and 27 made in the contacting faces of the inner tube 8.

In the modification shown in Figs. 3 and 4 leaf springs 20 are substituted in place of the pneumatic tube 8. The springs are here shown as having lugs or buttons 21 formed in them to enter recesses in the channeled portion of the sleeve 9 to hold the springs in relative positions while permitting of the proper freedom of their adjustment in use. This modification (see Fig. 4) shows the brace bolts 19' extending in oblique relation to the plate 7.

While I have described my invention with more or less minuteness as regards details of construction and arrangement and as being embodied in certain precise forms, I do not desire to be limited thereto unduly or any more than is pointed out in the claims. On the contrary, I contemplate all proper changes in form, construction and arrangement, the omission of immaterial elements, and the substitution of equivalents as circumstances may suggest or necessity render expedient.

I claim—

1. The combination with the felly of a wheel, of a pair of parallel annular plates contacting with the sides of the felly and by and between which the felly is held, a sleeve fastened to the outer edges of the plates, resilient means between the sleeve and felly, outwardly bowed case-rings secured to each edge of the sleeve to increase the tread of the wheel, said sleeve having an annular channel, adjustable means to regulate the distance apart of the edges of the case rings not secured to the sleeve, and a covering for the tread of the wheel retained by entering said channel.

2. The combination with the felly of a wheel, of a pair of parallel annular plates contacting with the sides of the felly between which the felly is held, a sleeve connecting the outer edges of the plates and secured to them, resilient means between the sleeve and the felly, outwardly bowed case-rings secured at their outer edges to the edges of the sleeve to increase the tread of the wheel, the inner edges of the case-rings being in contact with said annular plates and the adjacent portions of the rings being flat and parallel with the annular plates, and clamps to regulate the distance apart of the inner edges of said rings.

3. The combination with the felly of a wheel, of a pair of parallel annular plates contacting with the sides of the felly and holding the felly between them, a sleeve with an inward annular channel connecting the outer edges of the plates with the channel between the edges of the plates, an air-filled elastic tube between the sleeve and felly, case-rings having their outer edges secured to the edges of the sleeve and bowed outwardly to increase the tread of the wheel and having flattened inner edge portions contacting with said annular plates, means to regulate the distance apart of the inner edges of the case rings and a tread cover surrounding the tire thus formed and entering the annular channel in said sleeve.

4. The combination with the felly of a wheel, of a pair of parallel annular plates contacting with the sides of the felly and holding the felly between them, a sleeve with an inward annular channel said sleeve connecting the outer edges of the plates, an air-filled elastic tube between the sleeve and felly, case-rings having their outer edges secured to the sleeve said rings being thence bowed outwardly to increase the tread of the wheel and having flattened portions adjacent their inner edges, packing rings between the case-rings and annular plates, clamps to connect and regulate the distance apart of the inner edges of the case-rings, and a tread cover surrounding the sleeve and adjacent case-rings and entering the annular channel in the sleeve.

In witness whereof, I have hereunto set my hand and seal at Indianapolis, Indiana, this 12th day of June, A. D. one thousand nine hundred and thirteen.

MICHAEL H. CAIN. [L. S.]

Witnesses:
 JOSEPH A. MINTURN,
 HARRY J. QUIGLEY.